United States Patent [19]
Stavropoulos et al.

[11] Patent Number: 5,948,128
[45] Date of Patent: Sep. 7, 1999

[54] FLANGED CONDENSATE REMOVAL SYSTEM WITH REMOVABLE INSERT

[75] Inventors: Panos N. Stavropoulos, Vernon Hills; Paul E. DiNardo, Northbrook, both of Ill.

[73] Assignee: Engineering Resources, Inc., Elk Grove Village, Ill.

[21] Appl. No.: 08/739,500

[22] Filed: Oct. 28, 1996

Related U.S. Application Data

[63] Continuation of application No. 08/442,185, May 16, 1995, abandoned.

[51] Int. Cl.$^6$ ............................................. F16T 1/34
[52] U.S. Cl. ......................... 55/466; 137/177; 138/41; 138/44; 285/155; 285/412
[58] Field of Search ......................... 55/466; 285/755, 285/412; 137/177; 138/41, 44, 45

[56] References Cited

U.S. PATENT DOCUMENTS

| | | | |
|---|---|---|---|
| 2,031,849 | 2/1936 | O'Leary | 285/155 |
| 3,825,286 | 7/1974 | Henry, III | 285/155 |
| 4,171,209 | 10/1979 | Brown | 55/466 |
| 4,426,213 | 1/1984 | Stavropoulos | 55/466 |
| 4,486,208 | 12/1984 | Stavropoulos | 55/466 |
| 4,745,943 | 5/1988 | Mortensen | 55/466 |
| 4,919,710 | 4/1990 | Seki et al. | 55/466 |
| 5,137,556 | 8/1992 | Koulogeorgas | 55/466 |
| 5,429,150 | 7/1995 | Siefers, Jr. | 55/466 |

OTHER PUBLICATIONS

Advertisement of Steambloc Systems, "The Mechanical Steam Trap Solution".

*Primary Examiner*—C. Scott Bushey
*Attorney, Agent, or Firm*—Niro, Scavone, Haller & Niro

[57] ABSTRACT

A device for draining condensate from a steam system while substantially eliminating the passage of steam. The device has flanged inlet and outlet ends and includes a unitary Y-shaped body defining a fluid flow conduit, a filter device disposed within the Y-shaped body, and flanged inlet and outlet body ends configured for corresponding bolted connection with the flanged inlet and outlet ends of the steam system. The device also has an insert housing removably connected within the Y-shaped body and abutting the flanged outlet end of the steam system, and a nozzle structure removably positioned within the insert housing and having a constricted passageway in fluid communication with the fluid flow conduit. The insert housing can only be removed from the Y-shaped body by first disconnecting the Y-shaped body from the steam system, providing added safety for steam system operators.

12 Claims, 1 Drawing Sheet

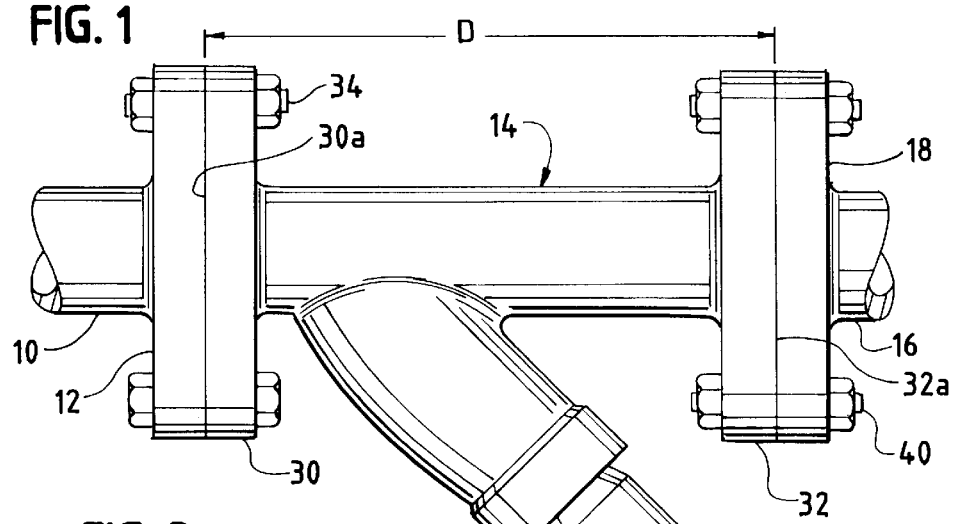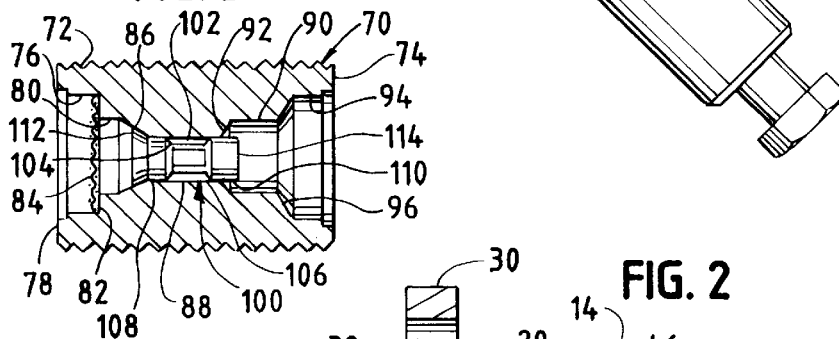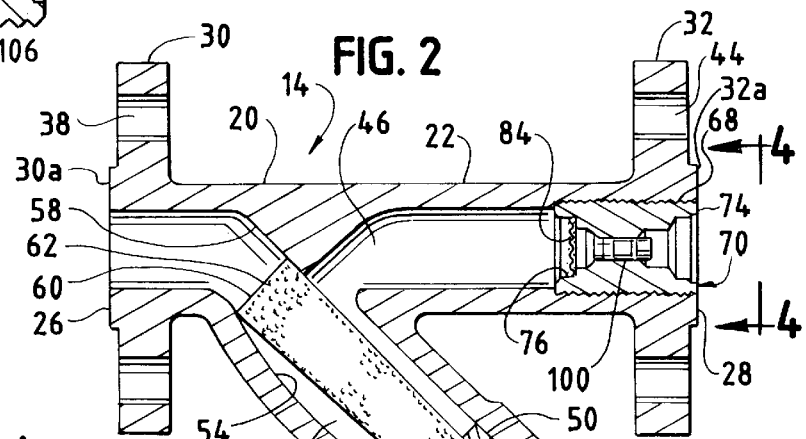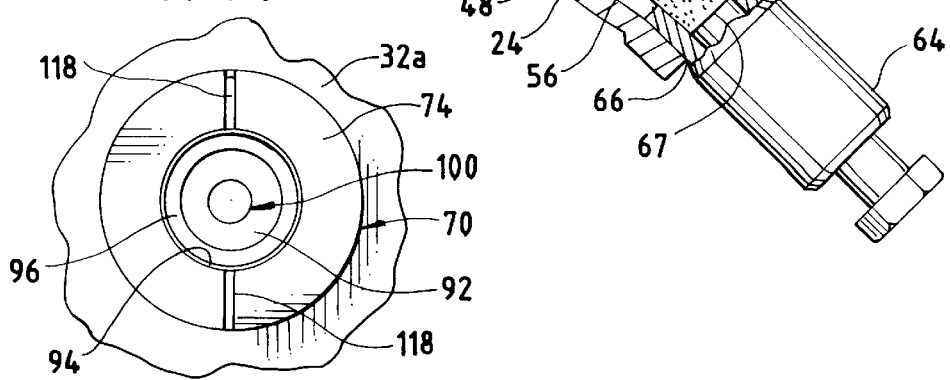

FLANGED CONDENSATE REMOVAL SYSTEM WITH REMOVABLE INSERT

This is a continuation application of application Ser. No. 08/442,185 filed May 16, 1995 now abandoned.

BACKGROUND OF THE INVENTION

This invention relates to liquid drainage devices for fluid conduit systems and, more particularly, this invention relates to devices for removing condensate from steam lines.

As steam travels through piping, it loses heat and condenses. As such, steam piping systems must be provided with equipment to remove the condensate which accumulates as heat is lost from the steam. Generally, condensate removal equipment is located at low points or pockets in the steam piping and at regular intervals in the extended runs of the steam piping, as well as at steam driven equipment which could be damaged by condensate.

Prior art condensate removal assemblies were often expensive to replace or repair, often required welded connections, and were not readily field repairable. These systems were expensive because each end of the condensate removal system was individually engineered to align with and connect to the specific steam system. Such assemblies were also cumbersome and inefficient to service because the assemblies generally required welded connections between the steam piping and the condensate removal assembly. Thus, any repair, maintenance or replacement required breaking old welds and forming new welds. Prior art steam systems also very often allowed for repair and replacement of the condensate removal device employed therein without having to shut down the steam system. The present invention requires shutting down the steam system for repair, which ensures greater safety to the operators. Also, as shown in U.S. Pat. No. 4,171,209 to Brown, the connections between the condensate removal assembly and the steam piping were typically threaded, resulting in a change in diameter due to one pipe being threaded into the other. This change in diameter resulted in complications in the steam system including the formation of eddy currents and pressure and steam travel rate fluctuations which reduced the overall performance of the steam system.

Older equipment, such as the widely employed inverted bucket condensate trap, has increasingly been replaced with more simplified orifice-style devices which alleviated many drawbacks of the prior art. For example, the device described in U.S. Pat. No. 4,426,213 includes a nozzle forming a restriction positioned in steam lines after a Y strainer and enables condensate to be forced through the small diameter orifice by the high pressure steam while preventing the steam from exiting through the orifice. The device also allows the nozzles to be interchangeable for service in a range of steam pressures.

The described device, however, can be improved upon in certain applications. The length of the nozzle device in combination with the Y strainer may be greater than the standard length for the inverted bucket condensate traps. Therefore, to be employed, the nozzle devices may require extensive modification to the steam equipment in condensate lines. In addition, use of the prior art condensate removal device in a steam system having flanged connections may require welding to add the necessary flanges to the condensate removal device.

The present invention accomplishes condensate removal from steam piping while improving upon prior art condensate removal devices. Thus, the present invention allows for convenient, efficient condensate removal from steam piping in a variety of different steam piping applications without requiring any piping re-configurations or expensive retrofitting.

It is therefore an object of the present invention to provide a device which removes condensate from steam lines while preventing the outflow of live steam.

It is a further object of the present invention to provide a device which can be employed in place of existing inverted bucket steam traps having standard dimensions.

It is a still further object of the present invention to provide a device which can be readily connected to steam lines and condensate lines having flange connections.

It is another object of the present invention to provide a condensate removal device which utilizes a removable nozzle which can be readily repaired or replaced at the location of operation.

It is yet another object of the present invention to provide a condensate removal device which is of a standard size and which can be bolted to and removed from existing steam systems.

SUMMARY OF THE INVENTION

The present invention provides a device for draining condensate from a steam system while substantially eliminating the passage of steam. The device preferably has flanged inlet and outlet ends, and includes a Y-shaped body defining a fluid flow conduit, a filter device disposed within the Y-shaped body, and flanged inlet and outlet body ends configured for corresponding bolted connection with the flanged inlet and outlet ends of the steam system. The device is configured such that the insert housing can only be removed from the Y-shaped body by first disconnecting the Y-shaped body from the steam system, providing steam system operators with an added safety feature.

More specifically, according to this invention, a device for condensate removal from steam equipment is provided having a body which forms a conduit which provides fluid communication between an inlet end and an outlet end. First and second flanges connected to the inlet and outlet portions of the body, respectively, provide flange connections to the steam equipment and condensate removal line. The body and first and second flanges are configured to allow the device to be employed within a predetermined, usually standardized, distance between the steam equipment and condensate removal line. Disposed within the conduit is a strainer for removal of solid particulates and a removable insert housing which defines a bore in fluid communication with the conduit. A tubular nozzle structure is inserted in the bore for constriction of fluid flow through the insert housing.

The interchangeable tubular nozzle structures provide variation in diameter and length of the constriction which can be employed with a given size bore for service and a range of steam pressures.

The invention enables provision of a condensate removal device having standardized dimensions and therefore serves as a replacement for prior art steam devices having standardized dimensions so that replacement thereof will not require extensive modification of the steam equipment and/or condensate removal piping.

The invention thus provides an economical and efficient condensate removal apparatus which is easily adapted to many steam piping configurations. The tubular nozzle is also itself adaptable for use in various environments, i.e. different steam pressures and steam flow rates. Furthermore, the present invention offers greater safety assurance than has been provided with prior art condensate removal devices. In prior art condensate traps, cleaning and replacement could be hazardous where the user attempted to clean or replace the unit while the system was operational. With the present invention, greater safety is accomplished because the present invention is an integral part of the steam piping which must be unbolted and removed to be cleaned. This attribute of the present invention allows easy access and maintenance and assures, since a segment of the piping will be physically removed, that the system is shut down before maintenance. Shutting down the system before maintenance operations begin ensures the user will not be harmed by the pressures and temperatures of the steam.

Additionally, because the present invention is adapted to fit into standard-sized steam piping, the present invention avoids the need to weld a condensate remover into place and break the welds for maintenance and cleaning. The present invention also is reliable and relatively economical because it uses no moving parts and can be partially manufactured with a snap-fit or press-fit construction.

The present invention thus provides a safe, economical and reliable condensate removal apparatus.

DESCRIPTION OF THE DRAWINGS

FIG. 1 is a side elevation view of an embodiment of the flanged condensate removal system with removable insert according to the present invention;

FIG. 2 is a vertical sectional view of the removal system of FIG. 1;

FIG. 3 is an enlarged sectional view of the removable insert shown in FIG. 2; and FIG. 4 is a partial vertical elevational view taken along line 4—4 of FIG. 2.

DETAILED DESCRIPTION OF THE PREFERRED EMBODIMENT

Referring to the condensate removal system as shown in FIG. 1, a mixture of condensate liquid and some steam is directed under generally high pressure from pipe 10 having flanged inlet end 12, through an embodiment of the condensate removal device of this invention generally designated by reference character 14. As used with regard to the present invention, the term "inlet" refers to the origination of the steam (to the left as shown in FIG. 1) and the term "outlet" refers to the condensate departure portion (to the right as shown in FIG. 1). Condensate is forced through removal device 14 and drained through condensate return line 16 having flanged outlet end 18. In standardized steam systems, the inlet end 12 and outlet end 18 are typically aligned and separated by a predetermined distance "D".

Referring to FIG. 2, removal device 14 includes a generally Y-shaped body 20. The body includes a laterally extending, generally cylindrical section 22 and a blow down arm 24 angled downward at an angle from the cylindrical section. The cylindrical section 22 has an inlet end 26 and outlet end 28 and the blow down arm 24 is angled toward the outlet end. The removal device 11 also includes an inlet flange 30 preferably integrally attached to and extending radially outward from inlet end 26. Similarly, the removal device 14 includes an outlet flange 32 preferably integrally attached to and extending radially outward from the outlet end 28.

Referring to FIG. 1, inlet flange 30 is securely attached to flange 12 by bolts 34 which extend through bolt holes formed in flange 12 and correspondingly spaced and sized bolt holes 38 (FIG. 2) formed in inlet flange 30. Similarly, outlet flange 32 is securely attached to flange 18 of condensate line 16 by bolts 40 which extend through bolt holes formed in the outlet flange and correspondingly sized and spaced bolt holes 44 (FIG. 2) formed in the flange 18. Inlet flange 30 includes circular outward face 30a and outlet flange 32 includes circular outward face 32a which is preferably coaxially aligned with the outward face 30a of the inlet flange. The distance from outward face 30a to outward face 32a corresponds to the predetermined distance "D" between inlet end 12 and outlet end 18, to allow the removal device 14 to be inserted in place of a common steam trap such as an inverted type bucket trap (not shown).

Referring to FIG. 2, the cylindrical section 22 of body 20 houses a generally cylindrical conduit 46 preferably coaxially aligned with the cylindrical section and which extends from inlet end 26 to outlet end 28. Blow down arm 24 houses a preferably coaxially aligned and generally cylindrical passageway 48 which extends from conduit 46 to a blow down opening 50 formed at the low end of the blow down arm. Blow down opening 50 houses threaded socket 52.

Extending longitudinally within passageway 48 and radially separated from an inside surface 54 of blow down arm 24 is a stainless steel wire mesh basket 56 of the type found in Y strainers (not shown) commonly used in steam systems. Extending downward into the conduit 46 opposite the upward opening of passageway 48 is a protrusion 58. The protrusion 58 is configured so that an upper end 60 of the strainer 56 abuts protrusion 58 and mates with an inlet section 62 of the conduit 46 formed by the protrusion 58 and inside surface 54 of blow-down arm 24. This abutting juxtaposition with protrusion 58 seals the upper end of basket 56 and directs fluid flow into the basket 56.

The basket 56 traps solid particulates contained in the steam and condensate mixture and prevents the particulates from passing through the conduit 46. Entrapped particulates are blown out through a commonly known blow-down valve 64 which includes an upper end 66 threadingly received in threaded socket 52. The upper end 66 encircles the lower end 67 of the basket 56.

Extending inward toward the inlet end 26 of the cylindrical section 22 from the outlet end 28 is a threaded portion 68 of the conduit 46. Condensate removal device 14 also includes an insert housing 70 having a threaded outer surface 72. The insert housing 70 is removably received in threaded portion 68, so that an outward face 74 of the insert is aligned with the outward face 32a of the outlet flange 32 where insert 70 will abut flanged outlet end 18 of condensate return line 16.

Referring to FIG. 3, the in a specifically preferred embodiment, insert housing 70 houses a cylindrical inlet tube 76 which forms a somewhat recessed opening in an inlet end 78 of the insert. The inlet tube 76 leads to a second tube 80 generally coaxially aligned with the inlet tube and of smaller diameter than the inlet tube thus forming annular shoulder 82. A generally circular filter element 84 can be positioned adjacent the shoulder 82, to remove any debris particles which have passed through strainer 56 (FIG. 2).

Second tube 80 leads to a converging conical formation 86 which converges to a cylindrical bore 88. A third tube 90 is coaxially aligned endwise with bore 88 and has a somewhat longer diameter than the bore. A second truncated conical bore 92 joins bore 88 with the third tube 90. A fourth tube 94 extending inward from the outward face 74 of the insert 70 is coaxially aligned endwise with third tube 90 and has a somewhat larger diameter than the third tube. A truncated conical bore 96 joins fourth tube 94 and third tube 90. To facilitate draining of the condensate from the device 14 into the condensate line 16 (FIG. 1), the diameter of the fourth tube 94 corresponds to the inside diameter of the condensate line.

Removably inserted within bore 88 is a generally elongated tubular nozzle structure generally designated by numeral 100. Nozzle 100 has the general configuration of a venturi tube with a substantially cylindrical vena contractu 102 joined between converging entrance formation 104 and diverging exit formation 106. Cylindrical inlet 108 and outlet 110 joining entrance 104 and exit 106, respectively, are substantially equal in outer diameter to the diameter of bore 88 to allow frictional press fit of nozzle structure 100 within the bore. Preferably, inlet formation 104 is provided with an outward flange 112 which engages the converging conical formation 86 of the insert housing 70 to properly position the insertion of the nozzle structure 100 in the bore 88. This configuration of nozzle 100 within bore 88 ensures nozzle 100 will not become automatically disengaged because nozzle 100 is press-fit in bore 88 in the direction of steam travel.

In the preferred embodiment, an exit portion 114 of the nozzle 100 projects from bore 88 into third tube 90. Fine particulates and eddy currents within the condensate exiting the nozzle 100 go to the inner surface of the third tube 90 which prevents clogging of nozzle 100.

Referring to FIG. 4, the outlet face 74 of insert housing 70 forms a pair of radially extending slots 118 aligned on opposite sides of the fourth tube 94. The slots 118 allow the insert housing 70 to be rotated by a screw driver so that the insert can be easily inserted or removed from the threaded portion 68 of the conduit 46 shown in FIG. 2. Further, outlet face 74 abuts steam system flanged outlet end 18 and thus is prevented from moving axially, which may otherwise occur due to the force of steam travel.

Referring to FIG. 1, in operation device 14 is placed between pipe 10 and condensate line 16. Inlet flange 30 of device 14 is bolted to inlet flange 12 of pipe 10. Similarly, outlet flange 32 of device 14 is bolted to flanged outlet end 18 of condensate line 16.

A combination of steam and condensate enters inlet end 26 of device 14 from pipe 10. Referring to FIG. 2, the steam and condensate mixture travel along conduit 46 toward outlet end 28 of device 14. As the steam and condensate travel through the basket entrance 62, the steam and condensate flow through the mesh basket 56 which acts to entrap particulates present in the steam and condensate. Particulates trapped by basket 56 are ejected through the opening 50 at the low end of blow down arm 24 by periodic actuation of blow down valve 64.

As the steam and condensate mixture enter and travel through inlet tube 76 of insert housing 70, filter element 84 traps particulates which passed through basket 56. The steam and condensate then enter nozzle 100 which allows the condensate to travel through nozzle and insert 70 and into condensate line 16 (FIG. 1). Nozzle 100 prevents the majority of the steam from passing through insert housing 70 and into condensate line 16.

A specific embodiment of the novel flanged condensate removal system with removable insert according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A device for draining condensate from a steam system having flanged inlet and outlet ends, while substantially eliminating the passage of steam, comprising:

a unitary Y-shaped body of predetermined length having a fluid flow conduit, a filter device, and flanged inlet and outlet body ends configured for corresponding bolted connection with the flanged inlet and outlet ends of the steam system;

an insert housing removably connected within the Y-shaped body and positioned to align with the flanged outlet end of the steam system; and a nozzle insertable within and removable from the insert housing, the nozzle having a length extending generally parallel to the fluid flow conduit, and the nozzle also having a constricted passageway in fluid communication with the fluid flow conduit, wherein the nozzle can only be removed from the Y-shaped body by first disconnecting the Y-shaped body from the steam system.

2. The device for draining condensate of claim 1, wherein the nozzle is tubular in shape.

3. The device for draining condensate of claim 1, wherein the insert housing is threadably attached to the Y-shaped body.

4. The device for draining condensate of claim 1, further comprising a second filter device including a screen positioned adjacent the insert housing.

5. The device for draining condensate of claim 1, wherein the nozzle is press-fit into the insert housing in the direction of steam flow.

6. The device for draining condensate of claim 1, wherein the nozzle has an outlet diameter which is less than or substantially equal to an outlet diameter of the steam system outlet end.

7. The device for draining condensate of claim 1, wherein the flanged body inlet has a diameter which is substantially equal to a diameter of the steam system flanged inlet.

8. The device for draining condensate of claim 1, wherein the Y-shaped body includes a blow-down valve.

9. The device for draining condensate of claim 1, wherein the steam system resides in an operating location, and the nozzle can be repaired or replaced at the operating location.

10. The device for draining condensate of claim 1, wherein the steam system resides in an operating location, and the Y-shaped body can be repaired or replaced at the operating location.

11. A device for draining condensate from a steam system having inlet and outlet ends, while substantially eliminating the passage of steam, comprising:

a Y-shaped body having a fluid flow conduit, a filter device, and inlet and outlet body ends configured for corresponding connection with the inlet and outlet ends of the steam system;

an insert housing removably connected within the Y-shaped body and positioned to be connected to the outlet end of the steam system; and a nozzle insertable within and removable from the insert housing, the nozzle having a constricted passageway in fluid communication with the fluid flow conduit, wherein the nozzle can only be removed from the Y-shaped body by first disconnecting the Y-shaped body from the steam system.

12. The device of claim 11 wherein the insert housing is threadedly connected to the Y-shaped body and to the outlet end of the steam system.

* * * * *